UNITED STATES PATENT OFFICE.

FRANK S. LOW, OF BUFFALO, NEW YORK.

PROCESS OF HARDENING RESINS AND PRODUCTS THEREOF.

1,243,312. Specification of Letters Patent. Patented Oct. 16, 1917.

No Drawing. Application filed January 31, 1916. Serial No. 75,425.

*To all whom it may concern:*

Be it known that I, FRANK S. LOW, a citizen of the United States, residing at Buffalo, in the county of Erie and State of New York, have invented certain new and useful Improvements in Processes of Hardening Resins and Products Thereof, of which the following is a specification.

This invention relates to processes of hardening resins and products thereof; and it comprises a method of hardening and stabilizing the softer natural resins, such as dammar resin, the soft copals and the like, and more particularly of hardening ordinary rosin or colophony, by producing an internal change in such resins with the aid of reactive chemicals, heat and pressure, wherein such a soft resin is heated to a comparatively high temperature under a suitable pressure, in the presence of active vapors or gases containing materials capable of readily uniting with reactive groups or components of such resin, as, for example, sulfur vapors or formaldehyde vapors, but more particularly formaldehyde vapors; and it comprises as a new material, a hard varnish resin resembling a hard copal and possessing the properties of a hardened and stabilized soft natural resin, such as colophony; all as more fully hereinafter set forth and as claimed.

There are large supplies of comparatively "soft" natural resins, such as rosin, gum dammar and the "soft" copals, such as Manila copal, commercially available which however are not deemed highly desirable components of varnish. These resins are called "soft", not because they are, necessarily soft at all temperatures, for many of them, like rosin are hard when cold, but because they are low melting resins which under conditions of use are, or may become, soft. Common rosin or colophony, for instance, makes when used with a suitable solvent a varnish film which softens and becomes tacky even at ordinary summer temperatures. And rosin varnish, like varnishes made from the other soft resins, is apt to fissure and scale off in time. Many efforts have been made to obviate these defects in the case of rosin, since not only is it a cheap resin but it gives a brilliant varnish of good appearance. These efforts however have not been particularly successful in the sense of giving a high grade varnish. Rosin contains acid constituents and for the most part, the experiments of the prior art have been in the direction of converting these acid constituents, partially or wholly, into their salts, such as the lime salts, the zinc salts, etc. These salts have a higher melting point than that of the rosin acids from which they are derived and an addition of bases therefor hardens the rosin to a certain extent; it enables it to form varnish films which will stand a summer temperature or the body temperature without becoming so sticky or tacky as is the case with untreated rosin. But in so hardening the rosin, the other defects of fissuring and perishability are not substantially bettered; the new products formed retain the character of the original rosin in this respect. Combining the acid groups with a base does not, of course, affect in any way the unsaturated groups to which the perishability is due. Similar difficulties obtain with the other soft varnish gums, not all of which are as acid in their nature as rosin. Not being so acid, naturally they cannot take up so much base and cannot be hardened to the same extent as rosin.

The perishability or alterability of these soft resins when used as varnish under atmospheric conditions, *i. e.*, when spread out as thin films exposed to light, air and moisture, is due, in the main at least, to the presence of readily reactive groups or components which undergo slow oxidation and chemical change.

In the present invention I have devised a process of improving the stability of these soft resins by what may be termed an accelerated aging in which I cause these alterable groups or components to be attacked by reactive vapors at high temperatures and pressures whereby the treated rosin is made insensitive to oxidation and similar changes when it is later used under varnish conditions. In so doing, I produce a union with or change of such alternable constituents or groups of the resin by, or under the influence of, such reactive chemicals. And I find that I achieve not only the highly desirable result of rendering the rosin or other soft resin permanent and stable as a varnish film but also the unexpected result of materially raising the melting point and thereby converting the soft resin into a hard resin; into a resin of the type of those which are known as the hard copals. For example, in treating rosin by the present process, its melting point is raised to a degree where varnishes made with it do not become tacky under atmospheric conditions. The rosin retains all of its desirable brilliance while the varnish films made from it, having had their attackable or susceptible portions chemically acted on, do not weather, fissure, scale, etc. In this treatment under the present invention the acid groups are not attacked or affected and the resin retains its saponifiability, the treated resin being capable of combining with bases such as lime, zinc, oxid, lead oxid, etc., in the same way as the untreated resin. While for special purposes the treated resin may be so combined with bases, ordinarily I do not recommend it. The rise in melting point due to the treatment itself is generally sufficient to obviate any necessity for further hardening by the addition of bases; and such an addition may be undesirable as unduly raising the melting point as well as lowering unduly the solubility of the treated resin in the usual varnish solvents.

Formaldehyde is one highly reactive chemical suitable for my purposes. I have found that if I expose rosin to the vapors of formaldehyde under heat and pressure, the changes in the rosin which I desire readily take place. In one typical embodiment of my invention, for example, I heat rosin in any suitable container or vessel in the presence of formaldehyde vapors and advantageously also in the presence of steam. It is convenient to place commercial 40 per cent. formaldehyde solution in the treatment vessel with the rosin prior to heating and allow generation of vapors of formaldehyde and steam in the receptacle itself, but vapors may be generated elsewhere and led into the treatment vessel through a suitable conduit. While some degree of action will take place at lower temperatures and pressures, I find that a very desirable type of action obtains at high temperatures with pressures ranging from, say, 75 pounds to 150 pounds. As a rule I run the temperature between, say, 250° to 400° F., although 250° to 300° is generally best. Using formaldehyde vapors at any given temperature, the pressures are more or less irregular and vary up and down during the heating, possibly because of chemical actions taking place. The temperatures and pressures given however may be deemed exemplificatory of those well adapted for the present purposes. After the rosin has been hardened to the degree desired, it may be cooled and removed from the treating vessel in any convenient way. The time of treatment varies somewhat with the nature of the vessel used. Ordinarily, however, with formaldehyde the process requires two to six hours heating under pressure.

Steam *per se* does not have the effects here desired; but it is a useful adjunct to other materials in the present process.

Manila copal, gum dammar or Singapore copal, etc., may be treated in exactly the same manner as rosin. The rosin after its treatment retains much of its original aspect but its solubility in the cold in ordinary rosin solvents, such as methyl alcohol, gasolene, turpentine, etc., is greatly diminished. On the other hand, with such varnish solvents as hot linseed oil, it behaves much like the natural hard copals; the so-called fossil resins. In fact it may be said that the rosin appears to have undergone a change the results of which are similar to those which in nature have produced the fossil gums. Varnishes made from this hardened rosin have the brilliant appearance characteristic of those made from natural or untreated rosin, but they are much more permanent; not fissuring or cracking with age. In this respect, these varnish films resemble those made from the hard copals.

Similar characteristics obtained with dammar resin and the soft copals treated in the present manner.

Instead of using vapors of formaldehyde, which is a highly reactive body, other highly reactive bodies capable of readily uniting with organic substances may be used, such for example, as sulfur. I have found that I may obtain quite similar, but not identical, results by using, instead of formaldehyde solution, a suspension of sulfur in water. On heating with rosin under pressure vapors of sulfur and of water are produced and the sulfur vapors attack the alterable constituents of the resin. It is apparently mainly the vapors of the sulfur which perform the action here desired. Peroxid of hydrogen may be employed, the ordinary commercial aqueous solution of peroxid of hydrogen, for example, being placed in the treatment vessel in lieu of the stated formaldehyde solution. The peroxid however I do not find as good as the formaldehyde or the sulfur vapors.

The hardened resins hereinbefore described may be converted into varnish with any of the usual vehicles or solvents used for hard resins.

What I claim is:—

1. The process of treating soft natural resins which comprises heating the same under pressure with highly reactive vapors in the presence of water vapors.

2. The process of treating soft natural resins which comprises heating the same under pressure with formaldehyde vapors.

3. The process of treating rosin which comprises heating the same under pressure with highly reactive vapors in the presence of water vapors.

4. The process of treating rosin which comprises heating the same under pressure with formaldehyde vapors.

5. As a new composition of matter a hardened resin possessing the general properties of the corresponding soft natural resin but differing therefrom by being permanent on exposure to air and light and having a higher fusing point, such hardened resin having the reactive groups of the natural resin combined with formaldehyde.

6. As a new composition of matter hardened rosin possessing the general properties of the corresponding soft natural resin but differing therefrom by being permanent on exposure to air and light and having a higher fusing point, such hardened rosin having the reactive groups of the natural resin combined with formaldehyde.

In testimony whereof, I affix my signature.

FRANK S. LOW.